United States Patent Office 3,257,202
Patented June 21, 1966

3,257,202
ELECTROPHOTOGRAPHIC MATERIAL
AND PROCESS
Heinz Schlesinger, Wiesbaden, and Johannes Munder,
Wiesbaden-Biebrich, Germany, assignors, by mesne assignments, to Azoplate Corporation, Murray Hill, N.J.
No Drawing. Filed Aug. 12, 1960, Ser. No. 49,178
Claims priority, application Germany, Aug. 20, 1959,
K 38,485
24 Claims. (Cl. 96—1.5)

Inorganic materials such as selenium and zinc oxide have been previously utilized as photoconductors for electro photographic purposes. Also, various organic compounds of low molecular weight, such as anthracene, chrysene and benzidine, have been used for these purposes.

Photoconductor coatings for electrophotographic purposes have now been found which consist at least in part of at least one polymerization product or interpolymer of olefinic ketones of the general formulae

and

in which $R_1$ is aralkylene, aryl, substituted aryl, a heterocyclic radical or a substituted heterocyclic radical,
$R_2$ is alkyl, aryl, substituted aryl, a heterocyclic radical or a substituted heterocyclic radical, and
$R_3$ is aralkylene, aryl, substituted aryl, a heterocyclic radical or a substituted heterocyclic radical.

Photoconductors falling within the scope of the present invention are: polymerization products and interpolymers of olefinic ketones having as a constituent of their molecule at least one of the polymerizable groups —CH=CH—CO— and —CH=CH—CO—CH=CH— and having a structure presumably as follows:

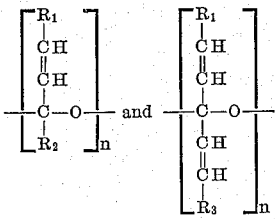

In these formulae $R_1$, $R_2$ and $R_3$ stand for the radicals described above and $n$ for an integer greater than one. The monomeric olefinic ketones are prepared from aldehydes or substituted aldehydes or the corresponding ketones by condensation, under conditions of heat by aldol condensation methods. Dilute alkalis are preferably used as condensation agents. The following are examples of the monomeric olefinic ketones suitable for the preparation of the polymers and interpolymers: 4-dimethylamino-benzylidene-acetone, bis-(4 - dimethylaminobenzylidene) - acetone, dicinnamylidene - acetone, anisylidene-acetone, di-anisylidene-acetone, 4-dimethylaminobenzylidene-acetone, cinnamylidene-acetophenone, 4-dimethylaminobenzylidene - 4' - diethylaminobenzylidene-acetone, 4 - dimethylaminobenzylidene - cinnamylidene - acetone. Other olefinic ketones are listed below.

The conversion of the monomeric olefinic ketones into high polymer products is preferably effected by heat polymerization in an open or closed vessel. The exclusion of atmospheric oxygen by means of an inert gas such as nitrogen, carbon dioxide or one of the group of rare gases can be important. According to the reaction conditions employed, e.g., temperature, duration of the reaction and additives or solvents used, high polymer products of differing consistencies and solubility characteristics may be prepared. The products obtained are mostly resin-like and may be applied as photoconductor coatings to supporting materials without a binder being necessary. If a mixture of monomers is used in the polymerization process, interpolymers, too, can be obtained.

For their employment as photoconductor coatings in electrophotography, the high polymer reaction products described above are best dissolved in an organic solvent and coated upon a support, e.g., the solution is cast, painted, or sprayed thereon and the solvent then evaporated. The products can also be applied in the form of aqueous or non-aqueous dispersions.

The base materials used as supports may be any that satisfy the requirements of electrophotography, e.g. metal or glass plates, paper or plates or foils made of electroconductive resins or plastics, such as polyvinyl alcohol, polyamides, and polyurethanes. Other plastics which have the required electroconductivity, such as cellulose acetate and cellulose butyrate, especially in a partially saponified form, polyesters, polycarbonates, and polyolefines, if they are covered with an electroconductive layer or if they are converted into electroconductive materials, e.g. by chemical treatment with or by introduction of materials which render them electrically conductive, may also be used. Generally speaking, electroconductive supports are suitable for the purposes of the present invention. In the sense of the present invention, the term "electroconductive support" comprises materials having a specific conductivity higher than $10^{-12}$ ohm$^{-1}$ cm.$^{-1}$, preferably higher than $10^{-10}$ ohm$^{-1}$ cm.$^{-1}$.

The supporting material, provided with a thin coherent coating of even thickness of the photoconductor layer as described above, is used for the preparation of copies by electrophotographic means in the following manner: the photoconductor coating is evenly charged in the absence of light, e.g., by corona discharge from a charging device maintained at 6000–7000 volts. The electrocopying material is then exposed to light behind a master, with which it is in contact, or, alternatively, an episcopic or diascopic image of the master is projected thereon. An electrostatic image corresponding to the master is then formed on the material. This invisible image is developed by being contacted with a developer consisting of carrier and toner. Specifically, fine glass balls, iron powder or fine plastic balls are used as the carrier. The toner consists of a mixture of resin and carbon black, or of pigmented resin. The toner is generally used in a particle size of about 1–100$\mu$, preferably 5–30$\mu$.

The developer may also consist of a resin or pigment suspended in a dielectric liquid in which resins may be dissolved. In the case of dry development, the image which is made visible by development is then fixed, e.g., by heating to 100–170° C., preferably 120–150° C., with an infra-red radiator, or by treatment with solvents such as trichloroethylene, carbon tetrachloride, or ethyl alcohol, or steam. In this way, images are obtained which correspond to the masters and which are characterized by good contrast effect.

If the polarity of the electrical charge used is opposite to the polarity of the toner contained in the developer, images corresponding to the master characterized by good contrast effect are obtained. By changing the polarity of the corona discharge, it is also possible to obtain reversed images from the same master and with the same developer. However, it is preferred also to change from a positive master to a negative master, and vice versa, when changing the polarity in order to obtain the best results. This is an advantage over the inorganic photoconductors such as zinc or selenium, which can be charged with one polarity only to give good images.

The electrophotographic images can also be converted into printing plates. For this purpose, they are wiped over with a suitable solvent or with a preferably aqueous alkaline developer liquid, rinsed down with water and then inked up with greasy ink. In this way, printing plates are obtained which can be set up in an offset machine and used for printing.

If transparent supporting material is used, the electrophotographic images can also be used as masters for further copying on any type of coatings. With translucent supporting material for the photoconductive coatings, images can also be produced by the reflex process.

The photoconductor coatings of the invention absorb light primarily in the ultra-violet region. The sensitivity thereof can be increased by the addition of activating materials; those described in copending application Serial No. 30752 filed May 23, 1960, now abandoned which are capable of acting as electron acceptors in molecule complexes of the donor/acceptor type ($\pi$-complex) and which have at least one aromatic or heterocyclic ring, which may be substituted, are exemplary of such activators. Activators are electron acceptors; they are compounds with a high electron affinity and are acids in the sense of Lewis' definition.

Activator properties are possessed by substances which have strongly polarizing radicals or groups, such as cyano and nitro groups; halogens, such as fluorine, chlorine, bromine and iodine; ketone groups, ester groups, acid anhydride groups, acid groups, such as carboxyl, or the quinone grouping. Strongly polarizing electron-attracting groups of this type are described by L. F. and M. Fieser in the "Lehrbuch der organischen Chemie," Verlag Chemie, 1954, p. 651, Table I. Of these, substances with a melting point above room temperature are preferable, i.e., solid substances of low volatility, because of the low vapor pressure thereof. Substances which are rather deeply colored, such as quinones, can be used, but those that are colorless or only weakly colored are preferable. The absorption maximum thereof should be preferably in the ultra-violet region of the spectrum, i.e., below 4,500 A°. Further, the activator materials should be of lower molecular weight, i.e. between about 50 and 5000, preferably between about 100 and 1,000, since with activators of lower molecular weight, it is possible for reproducible results to be obtained with respect to sensitivity. Also, the sensitivity remains constant over long periods, since compounds of lower molecular weight, unlike those of high molecular weight, undergo hardly any change in storage.

The following are examples of such compounds:

2-bromo-5-nitro-benzoic acid
2-bromobenzoic acid
2-chloro-toluene-4-sulfonic acid
Chloromaleic anhydride
9 chloroacridine
3-chloro-6-nitro-1-aniline
3-chloronitrobenzene-5-sulfochloride
4-chloro-3-nitro-1-benzoic acid
4-chloro-2-hydroxy-benzoic acid
4-chloro-1-phenol-3-sulfonic acid
2-chloro-3-nitro-1-toluene-5-sulfonic acid
4-chloro-3-nitro-benzene phosphonic acid
Dibromosuccinic acid
2,4-dichlorobenzoic acid
Dibromomaleic anhydride
9,10-dibromoanthracene
1,5-dichloronaphthalene
1,8-dichloronaphthalene
2,4-dinitro-1-chloro-naphthalene
3,4-dichloro-nitrobenzene
2,4-dichloro-benzisatin
2,6-dichloro-benzaldehyde
Hexabromonaphthalic anhydride
Bz-1-cyano-benzanthrone
Cyan acetic acid
o-Chloronitrobenzene
Chloracetophenone
2-chlorocinnamic acid
2-chloro-4-nitro-1-benzoic acid
2-chloro-5-nitro-1-benzoic acid
3-chloro-6-nitro-1-benzoic acid
Mucochloric acid
Mucobromic acid
Styrene dibromide
Tetrabromoxylene
$\beta$-Trichlorolactic acid nitrile
Triphenylchloromethane
Tetrachlorophthalic acid
Tetrabromophthalic acid
Tetraiodophthalic acid
Tetrachlorophthalic anhydride
Tetrabromophthalic anhydride
Tetraiodophthalic anhydride
Tetrachlorophthalic acid monoethylester
Tetrabromophthalic acid monoethylester
Tetraiodophthalic acid monoethylester
Iodoform
Fumaric acid dinitrile
Tetracyanethylene
2-cyanocinnamic acid
1,5-dicyanonaphthalene
3,5-dinitrobenzoic acid
3,5-dinitrosalicylic acid
2,4-dinitro-1-benzoic acid
2,4-dinitro-1-toluene-6-sulfonic acid
2,6-dinitro-1-phenol-4-sulfonic acid
1,3-dinitro-benzene
4,4'-dinitro-biphenyl
3-nitro-4-methoxy-benzoic acid
4-nitro-1-methyl-benzoic acid
6-nitro-4-methyl-1-phenol-2-sulfonic acid
2-nitrobenzenesulfinic acid
3-nitro-2-hydroxy-1-benzoic acid
2-nitro-1-phenol-4-sulfonic acid
4-nitro-1-phenol-2-sulfonic acid
3-nitro-N-butyl-carbazole
4-nitrobiphenyl
Tetranitrofluorenone
2,4,6-trinitro-anisole
Anthraquinone
Anthraquinone2-carboxylic acid
Anthraquinone-2-aldehyde
Anthraquinone-2-sulfonic acid anilide
Anthraquinone-2,7-disulfonic acid
Anthraquinone-2,7-disulfonic acid-bis-anilide
Anthraquinone-2-sulfonic acid dimethylamide
Acenaphthenequinone
Anthraquinone-2-sulfonic acid methlyamide
s-Tricyano-benzene
2,4-dinitro-1-chloronaphthalene
1,4-dinitro-naphthalene
1,5-dinitro-naphthalene
1,8-dinitro-naphthalene
2-nitro-benzoic acid
3-nitrobenzoic acid
4-nitrobenzoic acid
3-nitro-4-ethoxy-benzoic acid
3-nitro-2-cresol-5-sulfonic acid 5-nitrobarbituric acid
4-nitro-acenaphthene
4-nitro-benzaldehyde
4-nitro-phenol
Picric acid
Picryl chloride
2,4,7-trinitro-fluorenone
s-Trinitro-benzene
1-chloro-2-methyl-anthraquinone
Duroquinone
2,6-dichloroquinone
1,5-diphenoxy-anthraquinone
2,7-dinitro-anthraquinone
1,5-dichloro-anthraquinone
1,4-dimethyl-anthraquinone
2,5-dichloro-benzoquinone
2,3-dichloro-naphthoquinone-1,4
Acenaphthenequinonedichloride
Benzoquinone-1,4
1,2-benzanthraquinone
Bromanil
1-chloro-4-nitro-anthraquinone
Chloranil
1-chlor-anthraquinone
Chrysenequinone
Thymoquinone
1,5-dichloro-anthraquinone
1-methyl-4-chloro-anthraquinone
2-methylanthraquinone
Naphthoquinone-1,2
Naphthoquinone-1,4
Pentacenequinone
Tetracene-7,12-quinone
1,4-toluquinone
2,5,7,10-tetrachloro-pyrene-quinone The quantity of activator which is best added to the photoconductors is easily established by simple experiments. It varies according to the compound used and, in general, amounts to about 0.1 to 100 moles, preferably about 1 to 50 moles, per 1000 moles of photoconductor compound. Mixtures of several activator compounds may also be used. Moreover, in addition to these compounds, sensitizing dyestuffs may be added. By the addition of these activating materials photoconductor coatings can be prepared which have a high degree of light-sensitivity, particularly in the ultra-violet region, and are practically colorless.

The photoconductor coatings described above can be used both in reproduction processes and in measuring instruments for recording purposes, e.g., photographic recording instruments. They can also, however, be used in the production of other devices containing photoconductors, e.g., photoelectric cells, photoresistances, sensing heads or camera tubes.

The photoconductor coatings may also contain photoconductors in association with other photoconductors, as also with pigments such as zinc oxide, and titanium dioxide, or in some cases resins such as ketone resins. Where, resins are employed, the content of photoconductive compound should be at least 20 percent, by weight. The polymers used as photoconductors in accordance with the invention have the advantage that, as compounds of high molecular weight, they can be applied to supports in the form of uniform transparent coatings and do not require any binder or other materials to produce excellent photoconductor coatings. Moreover, with paper as a supporting material, a dense coating can be produced without excessive penetration of the coating solution.

The methods preferably used for the preparation of the compounds of high molecular weight are illustrated below. The other compounds listed may be prepared in an analogous manner. The necessary variations in experimental conditions, e.g., temperature or quantities of solvent used are matters of common konwledge to those skilled in the art.

(a) 15 parts by volume of a 10 percent sodium hydroxide solution are added to a solution, heated to boiling, which consists of 18.9 parts by weight of 4-dimethylamino-benzylidene-acetone and 10.6 parts by weight of benzaldehyde in 250 parts by volume of ethanol. Heating is continued under reflux for 15 minutes, during which time a red precipitate separates out. After cooling, it is separated by suction filtration and the benzylidene-(4-dimethylamino-benzylidene)-acetone is recrystallized from ethanol. Red needles are obtained with a melting point of 158–159° C.

7 parts by weight of benzylidene-(4-dimethylamino-benzylidene)-acetone are heated in a stream of $CO_2$ for eight hours at 210–215° C. After cooling, the brittle resin is dissolved in benzene and reprecipitated with petroleum ether; it is an orange-colored powder which softens between 122 and 135° C. It is very readily soluble in benzene, toluene and methylene chloride.

(b) 18.9 parts by weight of 4-dimethylamino-benzylidene-acetone and 14.9 parts by weight of 4-dimethylamino-benzaldehyde are dissolved in 150 parts by volume of ethanol. 10 parts by volume of 10 percent sodium hydroxide are added to this solution. After 30 minutes heating on a steam bath, red crystals of bis-(4-dimethylamino-benzylidene)-acetone separate out; after cooling, they are separated by suction filtration and recrystallized from ethanol. They melt at 192–194° C.

17 parts by weight of bis-(4-dimethylamino-benzylidene)-acetone are heated for eight hours to 230° C. in a stream of $CO_2$ for the purpose of resinification. After cooling, a brittle brown resin remains which softens between 160 and 170° C.

(c) 15 parts by weight of 4-dimethylamino-benzylidene-acetone are dissolved in 200 parts by volume of ethanol. 10.8 parts by weight of anisaldehyde are added, followed by 10 parts by volume of 10 percent sodium hydroxide, without heating. The mixture is heated for 45 minutes on a steam bath and, after cooling, the 4-dimethylamino-benzylidene-4'-methoxy-benzylidene - acetone crystals which have precipitated out are separated by suction filtration and recrystallized from ethanol. Yellow crystals are obtained with a melting point of 134–135° C.

For the preparation of the polymer, 19 parts by weight of the ketone are heated in a sealed tube for five hours at 220° C. The resin is dissolved in benzene and reprecipitated with petroleum ether. A yellow powder is obtained which is readily soluble in benzene and softens between 150 and 160° C.

(d) For the preparation of an interpolymer, 3 parts by weight of bis-cinnamylidene-acetone are intimately mixed with 3 parts by weight of bis-anisal-acetone and heated for 6 hours to 230° C. After cooling, the material is purified by reprecipitation from a benzene solution using petroleum ether. A light yellow powder is obtained which softens between 157 and 177° C.

If 3 parts by weight of bis-cinnamylidene-acetone and 1 part by weight of bis-anisal-acetone are used (resinification at 230° C. for eight hours), a light yellow powder is obtained which softens between 176 and 194° C.

In the table below compounds are listed which are exemplary of those which have been prepared by the methods described above. The individual columns are as follows:

Column 1: Compound number.
Column 2: Formula of the monomeric olefinic ketone.
Column 3: Melting point (° C.) of the monomeric olefinic ketone.
Column 4: Color of the monomeric olefinic ketone.
Column 5: Polymerization temperature and duration of polymerization process; (R) means that polymerization was performed in a sealed tube.
Column 6: Color of the compound.
Column 7: Softening temperature (° C.) of the compound of high molecular weight.

| 1 | 2 | 3 | 4 | 5 | 6 | 7 |
|---|---|---|---|---|---|---|
| 1 | $CH_3O-\bigcirc-CH=CH-CO-CH_3$ | 72 | Yellow | 220° C./4 hrs. (R) | Yellow | 94–100 |
| 2 | $(CH_3)_2N-\bigcirc-CH=CH-CO-CH_3$ | 134–135 | ...do... | 220° C./2 hrs. (R) | ...do... | 115–130 |
| 3 | $\bigcirc-CH=CH-CO-CH=CH-\bigcirc$ | 112–113 | ...do... | 180° C./8 hrs | ...do... | 82–90 |
| 4 | $(CH_3)_2N-\bigcirc-CH=CH-CO-CH=CH-\bigcirc$ | 158–159 | Red | 210–215° C./8 hrs | Orange | 122–135 |
| 5 | $(CH_3)_2N-\bigcirc-CH=CH-CO-CH=CH-\bigcirc-OCH_3$ | 134–135 | Orange | 220° C./5 hrs. (R) | Yellow | 150–160 |
| 6 | $(CH_3)_2N-\bigcirc-CH=CH-CO-CH=CH-\bigcirc-N(CH_3)_2$ | 192–194 | Red | 230° C./8 hrs | Red | 160–170 |
| 7 | $(CH_3)_2N-\bigcirc-CH=CH-CO-CH=CH-\bigcirc(Cl)-N(CH_3)_2$ | 134–135 | Red | 220° C./2 hrs | Yellow | 145–170 |
| 8 | $(CH_3)_2N-\bigcirc-CH=CH-CO-CH=CH-\bigcirc-N(C_2H_5)_2$ | 124–125 | Orange | 220° C./4 hrs | Orange | 102–120 |
| 9 | $(CH_3)_2N-\bigcirc-CH=CH-CO-CH=CH-\text{(furyl)}$ | 180–181 | Red | 210° C./4 hrs | Light brown | 145–157 |
| 10 | methylenedioxy-$\bigcirc-CH=CH-CO-CH=CH-\bigcirc$-methylenedioxy | 184–185 | Yellow | 260° C./45 min | Yellow | 160–170 |
| 11 | naphthyl-$CH=CH-CO-CH=CH-\bigcirc$ | 266–270 | ...do... | 320° C./3 hrs. (R) | Brown | (¹) |
| 12 | $\bigcirc-CH=CH-CH=CH-CO-CH=CH-CH=CH-\bigcirc$ | 141–142 | ...do... | 200° C./30 sec | Light brown | 135–145 |
| 13 | $\bigcirc-CH=CH-CH=CH-CO-\bigcirc$ | 102 | ...do... | 190–200° C./2 hrs | Yellow | 60–62 |
| 14 | $(CH_3)_2N-\bigcirc-CH=CH-CO-CH=CH-CH=CH-\bigcirc$ | 134–135 | Red | 220° C./4 hrs | ...do... | 145–170 |
| 15 | $(CH_3)_2N-\bigcirc-CH=CH-CO-CH=CH-\bigcirc-Cl$ | 181–182 | Orange | 210° C./4 hrs | Light brown | 155–163 |
| 16 | $CH_3O-\bigcirc-CH=CH-CO-CH=CH-\bigcirc$ | 110 | Yellow | 190–200° C./4 hrs | Yellow | 115–118 |
| 17 | $(CH_3)_2N-\bigcirc-CH=CH-CO-CH=CH-\text{(quinolinyl)}$ | 174 | Red | 210° C./4 hrs | Brown | 160–175 |
| 18 | $(CH_3)_2N-\bigcirc-CH=CH-CO-CH=CH-\bigcirc-OH$ | 137–138 | Yellow | 210° C./5 hrs | ...do... | >350 |

| 1 | 2 | 3 | 4 | 5 | 6 | 7 |
|---|---|---|---|---|---|---|
| 19 | $CH_3O$—C$_6$H$_4$—CH=CH—CO—CH=CH—C$_6$H$_4$—$OCH_3$ | 130–131 | ...do..... | 220–230° C./6 hrs.. | Yellow.... | 155–175 |
| 20 | $CH_3O$—C$_6$H$_4$—CH=CH—CO—CH=CH—(N-ethyl carbazolyl) | 160–163 | ...do..... | 210° C./6 hrs........ | ...do........ | 175–195 |
| 21 | $(CH_3)_2N$—C$_6$H$_4$—CH=CH—CO—C$_6$H$_4$—$OCH_3$ | 128–129 | ...do..... | 230° C./8 hrs. (R) | ...do........ | 60–87 |
| 22 | $(CH_3)_2N$—C$_6$H$_4$—CH=CH—CO—CH=CH—(pyridyl) | 240–242 | Red..... | 245° C./30 min. (R). | Brown.... | 210–225 |
| 23 | $(C_2H_5)_2N$—C$_6$H$_4$—CH=CH—CO—CH=CH—C$_6$H$_4$—$N(C_2H_5)_2$ | 38–39 | Yellow.. | 260° C./5 hrs. (R) | Yellow.... | 125–135 |
| 24 | $(CH_3)_2N$—C$_6$H$_4$—CH=CH—CO—C$_6$H$_5$ | 110–111 | Orange.. | 230° C./4 hrs........ | ...do........ | 101–120 |
| 25 | $(CH_3)_2N$—C$_6$H$_4$—CH=CH—CO—(pyridyl) | 263–265 | Yellow.. | 280° C./4 hrs. (R) | Brown.... | 170–185 |
| 26 | $(CH_3)_2N$—C$_6$H$_4$—CH=CH—CO—$C_2H_5$ | 107–108 | ...do..... | 240° C./4 hrs. (R) | Yellow.... | 102–117 |
| 27 | $(C_2H_5)_2N$—C$_6$H$_4$—CH=CH—CO—$CH_3$ | 52–53 | ...do..... | 250 °C./15 hrs. (R) | ...do........ | 140–180 |
| 28 | C$_6$H$_5$—CH=CH—CH=CH—CO—$CH_3$ | 64–65 | ...do..... | 210–220° C./6 hrs.. | Grey........ | 175–182 |
| 29 | $(CH_3)_2N$—C$_6$H$_4$—CH=CH—CO—CH=CH—C$_6$H$_3$($OCH_3$)(OH) | 199–200 | Orange.. | 230° C./4 hrs........ | Brown.... | >340 |
| 30 | $(CH_3)_2N$—C$_6$H$_4$—CH=CH—CO—(N-ethyl carbazolyl) | 96–97 | Yellow.. | 210° C./4 hrs........ | Yellow.... | 92–103 |
| 31 | $(CH_3)_2N$—C$_6$H$_4$—CH=CH—CO—CH=CH—C$_6$H$_4$—$NO_2$ | 205–206 | Red..... | 220° C./30 min.... | Brown.... | >300 |
| 32 | $(CH_3)_2N$—C$_6$H$_4$—CH=CH—CO—CH=CH—C$_6$H$_4$—$N(CH_3)_2$ | 188–190 | Red..... | 230° C./4 hrs........ | Red........ | 170–178 |
| 33 | C$_6$H$_5$—CH=CH—CO—(N-ethyl carbazolyl) | 157–158 | Yellow.. | 280° C./2 hrs........ | Yellow.... | 137–143 |

| 1 | 2 | 3 | 4 | 5 | 6 | 7 |
|---|---|---|---|---|---|---|
| 34 | (quinoline)—CH=CH—CO—(phenyl)—OCH₃ | 133–134 | ...do..... | 230–235° C./3 hrs... | Brown | 109–115 |
| 35 | (phenyl)—CH=CH—CO—(naphthyl) | 104–105 | ...do..... | 250° C./4 hrs. (R) | ...do..... | (²) |
| 36 | CH₃—(N-piperidyl/pyridyl)—CH=CH—CO—(phenyl)—OCH₃ | 87–88 | ...do..... | 180° C./7 hrs. | Light brown. | 94–110 |
| 37 | (furyl)—CH=CH—CO—CH=CH—(carbazolyl-N-C₂H₅) | 78–79 | Orange | 180° C./3 hrs. | Yellow | 84–92 |
| 38 | (CH₃)₂N—(phenyl)—CH=N—(phenyl)—CO—CO=CH—(phenyl)—N(CH₃)₂ | 214–216 | Yellow | 260° C./4 hrs. | ...do..... | 189–198 |
| 39 | CH₃—(N-het)—CH=CH—CO—CH=CH—(N-het)—CH₃ | 139–144 | ...do..... | 180–190° C./3 hrs. | Brown | 134–155 |
| 40 | (CH₃)₂N—(phenyl)—CH=CH—CO—(dibenzofuranyl) | 182–184 | ...do..... | 260–270° C./9 hrs. | Yellow | 140–144 |
| 41 | (CH₃)₂N—(phenyl)—CH=CH—CO—CH=CH—(phenyl)—CH=CH—CO—CH=CH—(phenyl)—N(CH₃)₂ | >300 | Red | 260° C./3 hrs. (R) | Red | >300 |
| 42 | No. 12 and No. 19 in equal proportions by weight | | | 230° C./6 hrs. | Light yellow. | 157–177 |
| 43 | No. 12 and No. 19 in 3:1 proportions by weight | | | 230° C./8 hrs. | ...do..... | 176–194 |
| 44 | No. 6 and No. 21 in equal proportions by weight | | | 230° C./6 hrs. | Orange | 104–120 |
| 45 | No. 4 and No. 6 in equal proportions by weight | | | 230° C./8 hrs. | ...do..... | 135–150 |
| 46 | No. 4 and No. 6 in 1:2 proportions by weight | | | 230° C./6 hrs. | ...do..... | 140–152 |
| 47 | No. 3 and No. 4 and No. 19 in equal proportions by weight | | | 220° C./4 hrs. | ...do..... | 92–108 |
| 48 | No. 19 and CH₃O—(phenyl)—CH=CH—CO—CH=CH—(phenyl)—CN in proportions of 1:1, by weight. | | | 220° C./6 hrs. | Yellow | 110–118 |
| 49 | (carbazolyl-N-C₂H₅)—CH=CH—CO—CH₃ | 73 | Yellow | 180–190° C./7 hrs. | ...do..... | 90–98 |
| 50 | (CH₃)₂N—(phenyl)—CH=CH—CO—CH=CH—(phenyl)—CH₃ | 159–160 | Orange | 230° C./6 hrs. | Orange | 138–145 |
| 51 | (CH₃)₂N—(phenyl)—CH=CH—CO—CH=CH—(phenyl)—CH(CH₃)₂ | 139 | ...do..... | 210–220° C./8 hrs. | Light brown. | 97–103 |

| 1 | 2 | 3 | 4 | 5 | 6 | 7 |
|---|---|---|---|---|---|---|
| 52 | 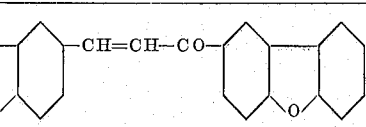 | 160–161 | Yellow | 280° C./7 hrs | Yellow | 133–137 |
| 53 | 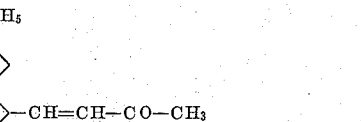 | 60 | ---do----- | 170–180° C./5 hrs | ---do----- | 98–105 |
| 54 |  | 116–117 | ---do----- | 220° C./2 hrs | Brown | 200–215 |

[1] Resin.
[2] Tough resin.

The invention will be further illustrated by reference to the following specific examples:

EXAMPLE 1

0.5 part by weight of the compound of high molecular weight obtained when bis-cinnamylidene-acetone is heated briefly to 200° C. in a $CO_2$ stream, is dissolved in 10 parts by volume of toluene. This solution is coated upon paper the surface of which has been treated to prevent the penetration of organic solvents. After evaporation of the solvent, a coating which adheres firmly to the surface of the paper remains. With the paper thus coated, a direct image is produced by the electrophotographic process. The dry coating is provided with a negative electric charge, by a corona discharge from a charging device maintained at about 6000 volts, and then exposed under a master to the light of a high-pressure mercury vapor lamp (125 watts) and dusted over with a developer in known manner. The developer consists of tiny glass balls and a very finely divided resin/carbon black mixture, known as the toner. The black-pigmented resin adheres to the areas not struck by light during the exposure and an image corresponding to the master becomes visible; it is fixed by slight heating.

The developer used, as described above, consists of 100 parts by weight of glass balls of a particle size of 350–400µ and 2.5 parts by weight of a toner of a particle size of 20–50µ. For the preparation of the toner, 30 parts by weight of polystyrene, 30 parts by weight of modified maleic acid resin (e.g., "Beckacite" K 105) and 3 parts by weight of carbon black (e.g., "Peerless Black" Russ 552) are melted together and the melt is then ground and sieved.

EXAMPLE 2

Paper is coated as described in Example 1 and the coating is provided with a positive charge by corona discharge. After the material has been exposed to light under a master, the electrostatic image thus obtained on the paper foil is dusted over with a developer as described in Example 1. Glass balls covered with resin, e.g., coumarone resin ("Cumaronharz 601/90") are used as the carrier. A very good, positive image of the master is obtained which is rich in contrast.

EXAMPLE 3

An aluminum foil is coated with a solution, in 10 parts by volume of toluene, of 0.5 part by weight of the compound of high molecular weight obtained when bis-(3,4-methylene-dihydroxy-benzylidene)-acetone is heated for 45 minutes at 260° C. in a stream of $CO_2$. After evaporation of the solvent, a firmly adherent coating remains. An electrophotographic image is prepared as described in Example 1.

EXAMPLE 4

0.25 part by weight of the compound of high molecular weight obtained when bis-(4-methoxy-benzylidene)-acetone is heated for 45 minutes to 260° C. and 0.25 part by weight of the compound of high molecular weight obtained when 4-dimethylamino-benzylidene-acetone is heated for 8 hours at 210–215° C. are dissolved in 10 parts by volume of benzene. The solution is coated upon an aluminum foil and dried. Electrophotographic images are prepared as described in Example 1.

EXAMPLE 5

0.5 part by weight of the product of high molecular weight obtained by brief heating of bis-cinnamylidene-acetone to 200° C. is dissolved, together with 0.006 part by weight of 2,3,6,7-tetranitrofluorenone, in 10 parts by volume of toluene. This solution is coated upon an aluminum foil and, after drying, an electrophotographic image is prepared as described in Example 1. The exposure time is a sixth of that required for an analogous coating not containing any 2,3,6,7-tetranitrofluorenone. Instead of the 2,3,6,7-tetranitrofluorenone, the same quantity of 1,2-benzanthraquinone-(9,10) can be used with equivalent results.

EXAMPLE 6

The solution described in Example 5 is used for the coating of a transparent paper lacquered with acetyl cellulose. Images are produced electrophotographically on this coated transparent paper and they can then be used as intermediate originals for further copying, e.g., on diazo paper.

EXAMPLE 7

0.5 part by weight of the compound of high molecular weight obtained when di-benzylidene acetone is heated for 8 hours to 180° C. in a stream of $CO_2$ and 0.006 part by weight of 1,2-benzanthraquinone-(9,10) are dissolved in 10 parts by volume of toluene. The solution is coated upon an aluminum foil, upon which, after evaporation of the toluene, a firmly adherent coating remains. Electrophotographic images are prepared as described in Example 1.

EXAMPLE 8

0.5 part by weight of the product of high molecular weight obtained when 4-dimethylaminobenzylidene-acetone is heated for 8 hours to 210–215° C. is dissolved in 10 parts by volume of toluene and this solution is coated upon an aluminum foil. After evaporation of the solvent, an electrophotographic image is prepared in the usual manner. The image free parts are then dissolved with a developer consisting of a mixture of 5 parts by volume of 85 percent phosphoric acid, 30 parts by volume of isopropanol and 65 parts by volume of water, the plate is rinsed with water and, after being wiped over with 1 percent aqueous phosphoric acid, is inked up with greasy ink. Printing is performed in an offset machine with the printing plate thus obtained; long runs are obtained.

Instead of the developer containing phosphoric acid described above, a 2.5 percent solution of hydrochloric acid may be used for development, in which case the printing plate is wiped over with a phosphoric acid or alkali phosphate solution before it is inked up.

EXAMPLE 9

A printing plate is prepared as described in Example 8 but for the coating solution, 3 parts by weight of a compound of high molecular weight obtained from bis-(4-dimethylamino-benzylidene)-acetone in 10 parts by volume of toluene are used and, as a developer, a mixture of 200 parts by volume of 5 percent aqueous phosphoric acid and 100 parts by volume of ethanol.

It will be obvious to those skilled in the art that many modifications may be made within the scope of the present invention without departing from the spirit thereof, and the invention includes all such modifications.

What is claimed is:

1. An electrophotographic material comprising an electroconductive support layer and a thin uniform photoconductive insulating layer coated thereon, the latter comprising a compound selected from the group consisting of polymerization products and interpolymers of a monomer having the formula $$R_1-CH=CH-CO-R_2$$

in which $R_1$ is selected from the group consisting of aralkylene, aryl and heterocyclic groups, and $R_2$ is selected from the group consisting of alkyl, aryl, heterocyclic and $-CH=CH-R_1$ groups, the monomer being polymerized through the ketone group.

2. An electrophotographic material comprising an electroconductive support layer and a thin uniform photoconductive insulating layer coated thereon, the latter comprising a compound selected from the group consisting of polymerization products and interpolymers of a monomer having the formula $$R_1-CH=CH-CO-CH=CH-R_2$$

in which $R_1$ and $R_2$ are aryl groups, the monomer being polymerized through the ketone group.

3. An electrophotographic material comprising an electroconductive support layer and a thin uniform photoconductive insulating layer coated thereon, the latter comprising a compound selected from the group consisting of polymerization products and interpolymers of a monomer having the formula $$R_1-CH=CH-CO-CH=CH-R_2$$

in which $R_1$ is an aryl group and $R_2$ is a heterocyclic group, the monomer being polymerized through the ketone group.

4. An electrophotographic material comprising an electroconductive support layer and a thin uniform photoconductive insulating layer coated thereon, the latter comprising a compound selected from the group consisting of polymerization products and interpolymers of a monomer having the formula $$R_1-CH=CH-CO-R_2$$

in which $R_1$ is an aryl group and $R_2$ is an alkyl group, the monomer being polymerized through the ketone group.

5. An electrophotographic material comprising an electroconductive support layer and a thin uniform photoconductive insulating layer coated thereon, the latter comprising a compound selected from the group consisting of polymerization products and interpolymers of bis-cinnamylidene-acetone, the latter being polymerized through the ketone group.

6. An electrophotographic material comprising an electroconductive support layer and a thin uniform photoconductive insulating layer coated thereon, the latter comprising a compound selected from the group consisting of polymerization products and interpolymers of bis-(3,4-methylene - dihydroxy - benzylidene)-acetone, the latter being polymerized through the ketone group.

7. An electrophotographic material comprising an electroconductive support layer and a thin uniform photoconductive insulating layer coated thereon, the latter comprising a compound selected from the group consisting of polymerization products and interpolymers of bis-(4-methoxy-benzylidene)-acetone, the latter being polymerized through the ketone group.

8. An electrophotographic material comprising an electroconductive support layer and a thin uniform photoconductive insulating layer coated thereon, the latter comprising a compound selected from the group consisting of polymerization products and interpolymers of 4-dimethylamino-benzylidene-acetone, the latter being polymerized through the ketone group.

9. An electrophotographic material comprising an electroconductive support layer and a photoconductive insulating layer coated thereon, the latter comprising a compound selected from the group consisting of polymerization products and interpolymers of di-benzylidene-acetone, the latter being polymerized through the ketone group.

10. An electrophotographic material comprising an electroconductive support layer and a thin uniform photoconductive insulating layer coated thereon, the latter comprising a compound selected from the group consisting of polymerization products and interpolymers of 4-dimethylaminobenzylidene-acetone, the latter being polymerized through the ketone group.

11. An electrophotographic material comprising an electroconductive support layer and a thin uniform photoconductive insulating layer coated thereon, the latter comprising a compound selected from the group consisting of polymerization products and interpolymers of bis-(4-dimethylaminobenzylidene)-acetone, the latter being polymerized through the ketone group.

12. An electrophotographic material according to claim 1 in which the photoconductive insulating layer contains an activator which increases the sensitivity of the photoconductor.

13. A reproduction process which comprises exposing an electrostatically charged, supported thin uniform photoconductive insulating layer to light under a master and developing the resulting image with an electroscopic material, the photoconductive layer comprising a compound selected from the group consisting of polymerization products and interpolymers of a compound having the formula $$R_1-CH=CH-CO-R_2$$

in which $R_1$ is selected from the group consisting of aralkylene, aryl and heterocyclic groups, and $R_2$ is selected from the group consisting of alkyl, aryl, heterocyclic and $-CH=CH-R_1$ groups.

14. A reproduction process which comprises exposing an electrostatically charged, supported thin uniform photoconductive insulating layer to light under a master and developing the resulting image with an electroscopic material, the photoconductive layer comprising a compound selected from the group consisting of polymerization products and interpolymers of a compound having the formula $$R_1-CH=CH-CO-CH=CH-R_2$$

in which $R_1$ and $R_2$ are aryl groups.

15. A reproduction process which comprises exposing an electrostatically charged, supported thin uniform photoconductive insulating layer to light under a master and developing the resulting image with an electroscopic material, the photoconductive layer comprising a compound selected from the group consisting of polymerization products and interpolymers of a compound having the formula

in which $R_1$ is an aryl group and $R_2$ is a heterocyclic group.

16. A reproduction process which comprises exposing an electrostatically charged, supported thin uniform photoconductive insulating layer to light under a master and developing the resulting image with an electroscopic material, the photoconductive layer comprising a compound selected from the group consisting of polymerization products and interpolymers of a compound having the formula

in which $R_1$ is an aryl group and $R_2$ is an alkyl group.

17. A reproduction process which comprises exposing an electrostatically charged, supported thin uniform photoconductive insulating layer to light under a master and developing the resulting image, the photoconductive layer comprising a compound selected from the group consisting of polymerization products and interpolymers of bis-cinnamylidene-acetone.

18. A reproduction process which comprises exposing an electrostatically charged, supported thin uniform photoconductive insulating layer to light under a master and developing the resulting image with an electroscopic material, the photoconductive layer comprising a compound selected from the group consisting of polymerization products and interpolymers of bis-(3,4-methylene-dihydroxy-benzylidene)-acetone.

19. A reproduction process which comprises exposing an electrostatically charged, supported thin uniform photoconductive insulating layer to light under a master and developing the resulting image with an electroscopic material, the photoconductive layer comprising a compound selected from the group consisting of polymerization products and interpolymers of bis-(4-methoxy-benzylidene)-acetone.

20. A reproduction process which comprises exposing an electrostatically charged, supported thin uniform photoconductive insulating layer to light under a master and developing the resulting image with an electroscopic material, the photoconductive layer comprising a compound selected from the group consisting of polymerization products and interpolymers of 4-dimethylamino-benzylidene-acetone.

21. A reproduction process which comprises exposing an electrostatically charged, supported thin uniform photoconductive insulating layer to light under a master and developing the resulting image, with an electroscopic material, the photoconductive layer comprising a compound selected from the group consisting of polymerization products and interpolymers of di-benzylidene-acetone.

22. A reproduction process which comprises exposing an electrostatically charged, supported thin uniform photoconductive insulating layer to light under a master and developing the resulting image with an electroscopic material, the photoconductive layer comprising a compound selected from the group consisting of polymerization products and interpolymers of 4-dimethylaminobenzylidene-acetone.

23. A reproduction process which comprises exposing an electrostatically charged, supported thin uniform photoconductive insulating layer to light under a master and developing the resulting image with an electroscopic material, the photoconductive layer comprising a compound selected from the group consisting of polymerization products and interpolymers of bis-(4'-dimethylamino-benzylidene)-acetone.

24. A reproduction process according to claim 17 in which the photoconductive insulating layer contains an activator which increases the sensitivity of the photoconductor.

References Cited by the Examiner

UNITED STATES PATENTS

| | | | |
|---|---|---|---|
| 2,091,715 | 8/1937 | Murray | 96—115 |
| 2,666,701 | 1/1954 | West | 96—115 |
| 2,668,813 | 2/1954 | Goldberg et al. | 260—240 |
| 2,716,103 | 8/1955 | Unruh et al. | 96—63 |
| 2,754,299 | 7/1956 | Deutsch et al. | 260—240 |
| 2,768,077 | 10/1956 | Neugebauer et al. | 96—115 X |
| 2,948,706 | 8/1960 | Schellenberg et al. | 260—66 |
| 2,954,291 | 9/1960 | Clark | 96—1 |
| 2,970,906 | 2/1961 | Bixby | 96—1 |
| 3,037,861 | 6/1962 | Hoegl et al. | 96—1 |
| 3,043,802 | 7/1962 | Thoma et al. | 96—115 |
| 3,072,479 | 1/1963 | Bethe | 96—1 |
| 3,097,095 | 7/1963 | Klupfel et al. | 96—1 |

OTHER REFERENCES

Chemical Abstracts, vol. 39, No. 24, Dec. 20, 1945, Subject Index, page 5963.

NORMAN G. TORCHIN, *Primary Examiner.*

PHILIP E. MANGAN, *Examiner.*